(12) United States Patent
Westrum et al.

(10) Patent No.: US 9,758,402 B2
(45) Date of Patent: Sep. 12, 2017

(54) METHOD AND REACTOR FOR BIOLOGICAL PURIFICATION OF WASTE WATER

(75) Inventors: Thorbjorn Westrum, Kongsberg (NO); Terje Andersen, Notteroy (NO); Jon G. Siljudalen, Husoysund (NO); Bjorn Rusten, Strum, WI (US)

(73) Assignee: BioWater Technology AS, Tønsberg (NO)

(*) Notice: Subject to any disclaimer, the term of this patent is extended or adjusted under 35 U.S.C. 154(b) by 0 days.

(21) Appl. No.: 13/375,103

(22) PCT Filed: Jun. 3, 2010

(86) PCT No.: PCT/NO2010/000207
§ 371 (c)(1),
(2), (4) Date: Dec. 7, 2011

(87) PCT Pub. No.: WO2010/140898
PCT Pub. Date: Dec. 9, 2010

(65) Prior Publication Data
US 2012/0067818 A1    Mar. 22, 2012

(30) Foreign Application Priority Data
Jun. 3, 2009   (NO) .................................. 20092151

(51) Int. Cl.
*C02F 3/10*   (2006.01)
*C02F 3/30*   (2006.01)
(Continued)

(52) U.S. Cl.
CPC ................. *C02F 3/06* (2013.01); *C02F 3/10* (2013.01); *C02F 3/1263* (2013.01);
(Continued)

(58) Field of Classification Search
CPC ..... C02F 3/06; C02F 3/10; C02F 3/12; B01D 29/0075; B01D 29/0079; B01D 23/10;
(Continued)

(56) References Cited

U.S. PATENT DOCUMENTS 4,253,947 A    3/1981  Fan et al.
4,322,296 A *  3/1982  Fan et al. ...................... 210/610
(Continued)

FOREIGN PATENT DOCUMENTS

CN    1730410 A    2/2006
CN    100337936    2/2006
(Continued)

OTHER PUBLICATIONS

Machine English Translation JP05-137906, Kataoka, Jun. 1993, pp. 1-8.*
(Continued)

*Primary Examiner* — Claire Norris
(74) *Attorney, Agent, or Firm* — Winstead PC

(57) ABSTRACT

Present invention relates to a method and apparatus for purification of water, said method comprises the steps of feeding the water into a reactor (4) through one or more inlet tubes (1) or inlet zones and feed water an substrate through carrier elements for bio film (5) which have a large protected surface (>200 m2/m3 carrier elements) and large pore volume (>60%), and that the carrier elements are fluidized for the removal of waste sludge, wherein the ratio of charge of the elements (5) by normal duty corresponds to an amount corresponding to 90%-100%, more preferred 92%-100%, and most preferred 92%-99% of the vet volume of the reactor (4), said carrier elements (5) is kept substantially at rest or hindered movement between the times surplus sludge is removed, and that the carrier elements being fluidised for removal of surplus sludge, said carrier elements (5) having (Continued)

a specific gravity in the area of 0.8-1.4, more preferred 0.90-1.1 and most preferred 0.93-0.97, and feed the treated water to one or more outlet zones (7) and one or more outlet tubes (2). The invention also comprises a reactor for performing the method.

14 Claims, 2 Drawing Sheets

(51) Int. Cl.
*B01D 24/46* (2006.01)
*C02F 3/06* (2006.01)
*C02F 3/12* (2006.01)
*C02F 3/28* (2006.01)

(52) U.S. Cl.
CPC .......... *C02F 3/2826* (2013.01); *C02F 3/2833* (2013.01); *Y02W 10/15* (2015.05)

(58) Field of Classification Search
CPC ........ B01D 23/24; B01D 24/02; B01D 24/10; B01D 24/36
USPC ........ 210/615, 618, 620, 791, 276, 407, 411
See application file for complete search history.

(56) References Cited

U.S. PATENT DOCUMENTS

| | | | |
|---|---|---|---|
| 5,057,221 A * | 10/1991 | Bryant | C02F 3/06 210/610 |
| 5,126,042 A | 6/1992 | Malone | |
| 5,350,505 A * | 9/1994 | Tang | 210/108 |
| 5,458,779 A * | 10/1995 | Odegaard | 210/616 |
| 6,007,712 A * | 12/1999 | Tanaka et al. | 210/151 |
| 6,383,373 B1 | 5/2002 | Nakao et al. | |
| 7,527,728 B2 * | 5/2009 | Jackson | 210/150 |
| 7,794,598 B2 * | 9/2010 | Zaitsev | 210/605 |
| 7,914,678 B2 * | 3/2011 | Beggs | 210/617 |
| 2009/0078648 A1 * | 3/2009 | Torrijos et al. | 210/618 |

FOREIGN PATENT DOCUMENTS

| | | |
|---|---|---|
| JP | S6427694 A | 1/1989 |
| JP | H0312284 A | 1/1991 |
| JP | 5068991 A | 3/1993 |
| JP | H05137906 A | 6/1993 |
| JP | 2000503896 A | 4/2000 |
| JP | 2000185293 A | 7/2000 |
| JP | 2000202482 A | 7/2000 |
| JP | 2012528716 A | 11/2012 |
| JP | 05-137906 B2 | 2/2013 |
| NO | 172687 | 7/1992 |
| NO | 314255 | 11/1996 |
| WO | WO-9525072 A1 | 9/1995 |
| WO | WO-0034187 A1 | 6/2000 |
| WO | WO-2006114552 A2 | 11/2006 |
| WO | WO-2007/077298 A1 | 7/2007 |

OTHER PUBLICATIONS

Bertil Dahl/Ely, "International Search Report" for PCT/NO2010/000207, as mailed Sep. 29, 2010, 4 pages.

* cited by examiner

METHOD AND REACTOR FOR BIOLOGICAL PURIFICATION OF WASTE WATER

The present invention relates to a method for biological purification of water in a reactor with one or more inlet and outlet zones where water and substrate come into contact with carrier elements for a biofilm. The invention also relates to a reactor for carrying out the method and for separation of biofilm sludge.

The reactor can be arranged for aerobic, anaerobic and anoxic purification of municipal and industrial waste water, processing water, water from aquaculture installations and drinking water. The process is based on the principle that biomass is established on a carrier element for the formation of a biofilm. The carrier elements are held in place in the reactor with the help of an outlet arrangement. The degree of filling of the carrier elements in the reactor is so large that during normal operation they are not free to move—hindered movement. All known types of carrier elements, with a specific weight relatively near to the specific weight of water can be used. Compared to a number of other biofilm processes on the market, the invention will result in a better transfer of oxygen from the air blown into the water and a better transport of water and substrate to the biofilm, something which will result in a more compact and less energy demanding installation.

A number of methods for mechanical, chemical and biological purification of water are known. Biological purification entails that a culture of micro-organisms carries out the desired transformation of the materials in the water. Biological purification is, to a large extent, combined with mechanical and chemical purification methods.

Biological purification is much used for purification of polluted water. Traditionally, biological purification has been completely dominating for removal of organic materials and, for the last years, biological purification has also become dominating for the removal of nitrogen (nitrification, de-nitrification, anammox) and relatively common for removal of phosphorous (bio-P removal).

One distinguishes between aerobic, anoxic and anaerobic biological processes. In aerobic processes the micro-organisms need molecular oxygen as an electron acceptor. For anoxic processes one depends on the absence of molecular oxygen and the micro-organisms will use nitrate or sulphate as the electron acceptor. For biological removal of nitrogen one combines an aerobic process, which oxidises ammonium to nitrate, with an anoxic process that reduces nitrate to molecular nitrogen gas. Anaerobic processes take place in the absence of oxygen and are characterised in that the organic material in the water is both electron donor and electron acceptor. Anaerobic processes are most relevant for highly concentrated industrial discharge of organic matter and in a complete decomposition the end product will be a mixture of methane and carbon dioxide (biogas).

The micro-organisms one needs for biological purification could, in principle, be suspended in the water phase in a bioreactor, or be attached to surfaces in the bioreactor. A process with suspended micro-organisms is called an activated sludge process. The micro-organisms in an activated sludge process must be able to form floccules that are separated from the water in a downstream reactor and are returned to the bioreactor. Alternatively, the suspended micro-organisms can be held in place in the bioreactor in that the purified water is drained from the reactor via membranes with pore openings so small that the micro-organisms are held back in the bioreactor. This is known as a membrane bioreactor (MBR) process.

A process where the micro-organisms are attached to a surface is called a biofilm process. Examples of biofilm processes used in purification of water are trickling filters, bio rotors, submerged biological filters, moving bed processes and fluidised bed processes. Submerged biological filters include both filters with a relatively open carrier medium of plastic and filters with a carrier medium of a small diameter (sand, Leca balls, small polystyrene balls). Submerged biological filters with a carrier medium of a small diameter will relatively quickly be clogged up with biosludge and must be regularly taken out of operation for backflushing and removal of the sludge. Submerged biological filters with an open carrier medium that are kept lying still can be operated for a relatively long time with a continuous supply of water, but experience has shown that even filters with a large carrier medium and an open structure will be clogged up after some time. As the micro-organisms in biofilm processes are fixed on the surface of a carrier material in a bioreactor, the biofilm process itself is independent of downstream sludge separation.

Combinations of processes with suspended micro-organisms and processes with fixed micro-organisms in the same reactor are known as IFAS (integrated fixed film and activated sludge) processes. IFAS processes have been comprised of activated sludge in combination with either bio rotors, submerged biological filters with an open carrier medium or moving bed processes.

On a global basis, there are clearly more biological purification plants with suspended micro-organisms, but biofilm processes are becoming more and more popular. Some of the reasons for this are that activated sludge processes have a number of disadvantages. It is often difficult to keep control of the sludge separation. This can lead to large losses of sludge and, in the worst case, that the biological process collapses, with the associated consequences for the recipient. Another disadvantage is that conventional activated sludge processes need very large volumes both for the reactor and for the sludge separation in the sedimentation basin. However, the advantage with conventional activated sludge processes is that the water is treated in open reactors where there is no danger of the reactor becoming blocked.

The membrane bioreactor process (MBR) is a relatively new technology where membranes with very small pore openings are used to separate the activated sludge from the water. With this technology one can manage with considerably smaller reactor volumes than for a conventional activated sludge process, in that one can keep a considerably higher concentration of micro-organisms in the reactors. Furthermore, the purified water will be free of suspended matter. The disadvantages with this process are that it is still very costly, it requires much pre-treatment of the water to remove materials that can lead to clogging of the membranes, the membranes must be washed regularly to maintain the hydraulic capacity and the energy consumption is relatively high.

Traditional trickling filters are the biofilm processes that were first taken into use for purification of waste water. Initially, trickling filters were filled with stone, but modern trickling filters are filled with plastic materials with a larger surface area for the biofilm to grow on. Modern trickling filters are relatively tall. The water is pumped to the top of the trickling filter and distributed evenly over the whole surface. The supply of oxygen takes place by natural ventilation. It is difficult to adjust the amount of water, load of matter and natural supply of oxygen in a trickling filter so that everything functions optimally. It is relatively common that the biofilm in the upper parts of a trickling filter does not get enough oxygen. Therefore, trickling filters have normally lower conversion rates and require larger reactor volumes than other biofilm processes. To avoid becoming clogged up the biofilm medium must be relatively open and the specific biofilm area ($m^2$ biofilm per $m^3$ reactor volume) becomes relatively small. This also contributes to an increased reactor volume. Even with an open biofilm medium, clogging and channel formation in trickling filters are well known problems which can be kept under control in that one ensures that each part of the trickling filter is repeatedly subjected to a hydraulic load which is sufficiently large to rinse particulate matter and loosened biofilm out of the trickling filter. In many cases this means that one must recirculate water over the trickling filter. With a height of many meters, energy costs for pumping can be considerable.

Bio rotors are biofilm processes that became very popular in the 1970's. The principle is that one has circular discs with corrugated surfaces secured to a horizontal shaft that rotates slowly in a basin. The discs are partially submerged in the water and a biofilm is established on the discs which alternatively take up polluting material from the water phase and oxygen from the air when the discs rotate. A big disadvantage with the bio rotor systems is that they are based on prefabricated rotors that make the system not very flexible. All basins must be adapted to the dimensions of the bio rotor. It has also been found that there are considerable mechanical problems with the bio rotors, often caused by that one can not manage to control the thickness of the biofilm, so that the weight becomes too large and the shaft may break or the biofilm medium comes apart. Therefore, very few bio rotor plants have been built over the last 20 years.

Submerged biological filters with a relatively open biofilm medium use, in principle, the same type of plastic material as modern trickle filters. The plastic material is stationary, submerged in the reactor and oxygen is supplied via diffuser aerators at the bottom of the reactor. A problem with submerged bio filters of this type has been clogging from growth of biomass and formation of channels. Water and air take the path of least resistance and zones are formed in aerated reactors where the biomass is accumulated resulting in anaerobic conditions. Another disadvantage is that one has no access to the aerators below the stationary biofilm medium. For maintenance or replacing of the aerators one must first remove the biofilm medium from the reactor.

Submerged biological filters with a carrier medium of a small diameter (sand, Leca balls, small polystyrene balls) have a very large biofilm surface area. The carrier medium is stationary during normal operation, but this type of filter will clog up with bio sludge and must regularly be taken out of operation for backflushing and removal of sludge. The process is sensitive to particles in the waste water and for waste waters with much suspended matter the operation cycles between each flushing become very short. Because of fittings for flushing and placing of the aerator at the bottom of the reactors, these types of biofilm reactors are complicated to construct. A common designation for this type of biofilm reactor is BAF (biological aerated filter) and the best known brand names are Biostyr, Biocarbone and Biofor.

In moving bed reactors, the biofilm grows on a carrier material that floats freely around in the reactor. The carrier material has either been foam rubber or small elements of plastic. Processes that use foam rubber pieces are known by the name Captor and Linpor. The disadvantages with foam rubber pieces are that the effective biofilm area is too small because the growth on the outside of the foam rubber pieces clogs up the pores and prevents ingress of substrate and oxygen to the inner parts of the foam rubber pieces. Furthermore, one must use sieves that prevent the foam rubber pieces leaving the reactors and one must have a system which regularly pumps the foam rubber pieces away from the sieves to prevent these from blocking up. Therefore, very few plants have been built with foam rubber as the carrier material.

However, in recent years a series of purification plants have been built with moving bed processes where the carrier material is small pieces of plastic. The pieces of plastic are normally distributed evenly in the whole of the water volume and in practice one operates with degrees of filling with biofilm medium up to about 67%. Sieves keep the plastic pieces in place in the reactor. The reactors are operated continuously without the need for back flushing. The patent NO 172687 B3 describes that one operates with 30 to 70% degree of filling and the particles move freely. The carriers shall have a specific weight of 0.90-1.20. The patent also states that one has mixing appliances to ensure a good mixing of the reactor content. It is important that there must be a steady stream of produced sludge to the subsequent separation process so that the particle load becomes much smaller than for separation of activated sludge. It is also pointed out that this is a continuous process, in contrast to biofilter processes with regular backflushing. The process is very flexible with regard to the shape of the bioreactor. The specific biofilm surface area is higher than for trickling filters and bio rotors, but considerably smaller than in BAF processes. However, on a total volume basis moving bed processes with a carrier material of small plastic pieces have been found to be as efficient as BAF processes when one takes into account the extra volume one needs for expansion of the filter bed and for the flushing water reservoir in the BAF processes. Examples of suppliers of moving bed processes with small plastic pieces as a carrier material are Anox Kaldnes, Inflico), Degremont and Hydroxyl Systems.

In a fluidised bed process the biofilm grows on small grains of sand. The operating principle is based on water being pumped into the bottom of the reactor at such a high rate that the sand is fluidised. One achieves a very large biofilm surface area in such a system and in aerobic processes one gets the problem of supplying enough oxygen. Normally water is recirculated many times to get the rate of flow high enough to fluidise the sand and one supplies oxygen by saturating the recirculated stream of water with air or pure oxygen. The pumping costs can be large. In full scale plants one has the problem of distributing the water in such a way that the whole of the sand bed fluidises. One also has problems in that the biofilm changes the specific weight of the sand grains so that the sand grains with much biofilm fluidise at a considerable lower circulation rate of water than the sand grain with a smaller biofilm. Thus, it gets difficult to operate the plant so that one does not lose sand and biomass.

The present invention is comprised of a biofilm process where the growth surface for micro-organisms consists of carrier elements that are packed so closely that they can not move freely in normal operation, but they have no, or a hindered, movement. The ideal carrier elements have a large protected surface area and a large pore volume so that the water can flow through the carrier elements and ensure good contact between water, substrate and biofilm. All known types of carrier elements with a specific weight relatively near the specific weight of water can be used.

The degree of filling of carrier elements is greater than in moving bed processes. Because of increased degree of filling and thus no, or a hindered, movement of the carrier elements, the velocity gradient between the biofilm and water will increase. Thus, the thickness of the stationary layer of water above the biofilm is reduced, the resistance to diffusion is reduced, the transport of substrate and oxygen is improved and the rate of conversion is increased. It is desirable that the biofilm elements have a large pore volume so that they can store as much sludge as possible on and in the biofilm elements before excess sludge must be washed out of the reactor. Thus, one can get long operating periods between each washing.

A reactor for biological purification of water is known from CN 100337936C. The reactor contains carrier elements for a biofilm and these elements have a specific weight of 0.7-0.95 and the degree of filling for the elements is 20-90% of the effective volume of the reactor.

From NO 172687 mentioned above, a method and a reactor for purification of water are known. The water is fed into the reactor which is filled with the carriers for the biofilm. These carriers have a specific weight in the area 0.90-1.20 kg/dm$^3$ and a degree of filling for the carriers of 30-70% of the reactor volume. Furthermore, the reactor has mixing equipment and also appliances in the form of a sieve plate to retain the carriers in the reactor.

NO 314255 describes an application of carrier elements in connection with the purification of water. The carrier elements are placed in a reactor where the inlet for water is at the top of the reactor. The carriers are freely suspended and have a specific weight of 0.92-1.40 kg/dm$^3$.

The carriers which are known from these three publications are in free movement.

How to pack carrier elements in a netbag to prevent movement between the carriers is known form JP 5068991A. The carrier elements have a specific weight of 0.95-0.98. This net bag with the carriers can be used in a number of reactors for treatment of waste water.

U.S. Pat. No. 6,383,373 B1 describes a biological filtration apparatus for purification of water. The filtration apparatus comprises a container which is closely packed with carrier elements, whereupon these are hollow, and has a specific weight of 1.01-1.2 g/ml. The water that shall be treated is led through one or more inlets at the top of the container.

The carriers which are known from these two publications do not move at all.

The invention is comprised of a method for biological purification of water which is characterised in that one has a continuous or intermittent supply of water to the reactor and intermittent washing with incoming water to remove sludge from the biofilm elements.

The method is characterised by leading water into a reactor though one or more inlet pipes or inlet zones and leading water and substrate through the carrier elements for the biofilm that has a high protected surface area (>200 m$^2$/m$^3$ carrier elements) and a large pore volume (>60%) where the carrier elements are held approximately stationary or have restricted movement between each time the excess sludge is removed, and that the carrier elements are fluidised for the removal of excess sludge, as the degree of filling of the elements at normal operation constitutes an amount corresponding to 90%-100%, more preferred 92%-100% and most preferred 92%-99% of the reactor liquid volume, where the carrier elements are kept approximately stationary or have restricted movement between each time excess sludge is removed, and that the carrier elements are fluidised for removal of excess sludge, as the elements have a specific weight in the area 0.8-1.4, more preferred 0.90-1.1 and most preferred 0.93-0.97, and lead the treated water to one or more outlet zones and one or more outlet pipes.

The elements are preferably fluidised in that the water level in the reactor is temporarily increased so that the degree of filling of the elements becomes less than 90%, more preferred less than 85% and most preferred less than 80% of the reactor liquid volume, in that a mixing mechanism creates turbulence in the reactor so that excess sludge is torn off the elements and sedimented sludge is suspended, and in that the inlet water is led into the reactor through one or more inlet pipes or inlet zones and thus brings sludge out of the reactor through one or more outlet zones and one or more pipes for sludge and when the sludge is removed, the water level in the reactor is reduced in that the treated water is led out through one or more outlet pipes so that the degree of filling for the elements during normal operation is 90%-100%, more preferred 92%-100% and most preferred 92%-99% of the reactor liquid volume.

A continuous stream of polluted water is preferably supplied to the reactor through one or more inlet pipes or inlet zones.

The method is further characterised in that at the removal of sludge a discontinuous stream of untreated water is supplied to the reactor through one or more inlet pipes or inlet zones, the supply of untreated water is stopped after the water level in the reactor is raised and provides turbulence with the help of mixing appliances to create turbulence in the reactor to fluidise the elements so that excess sludge is torn off the elements and sedimented sludge is resuspended, and thereafter again lead inlet water into the reactor through one or more inlet pipes or inlet zones so that sludge can be brought out of the reactor through one or more outlet zones and one or more pipes for sludge.

During normal operation the degree of filling (bulk volume) of the biofilm elements is so large that one has no, or very limited movements, of the biofilm elements. The degree of filling in the liquid volume during normal operation will be dependent on the type of biofilm elements that are used, but will normally be from 90-100%. During washing to remove sludge the water level in the reactor is increased sufficiently for all biofilm elements to be free to move. Which filling degree and how much turbulence one needs during the washing will again be dependent on the type of biofilm element used. The specific weight of the biofilm elements ought to be between 0.85 and 1.25.

The invention also comprises a reactor for aerobic, anoxic or anaerobic treatment of the waste water, said reactor is characterised in that it comprises one or more inlet pipes and one or more inlet zones and one or more outlet zones and outlet pipes for water and substrate, and one or more outlet pipes for sludge and one or more mixing appliances for transport of water and substrate, and a degree of filling for the elements during normal operation which constitutes an amount corresponding to 90%-100%, and more preferred 92%-99% of the reactor liquid volume and which is thereby so large during normal operation that it prevents free movement of the elements, so that by removal of sludge through a pipe the water level is raised so much that the elements can move freely with the help of one or more of said mixing appliances.

Preferably, an appliance to retain the elements in the reactor is provided at the outlet zones.

Preferably, it also comprises a mixing mechanism for transport of water and substrate and supply of oxygen in an aerobic process or a mixing mechanism for transport of water and substrate in an anaerobic and anoxic process.

The invention will be explained in the following in more detail with the help of an embodiment example with reference to the enclosed figures, where:

Standard operating procedure for the new biofilm process with continuous supply of water and intermittent removal of sludge is outlined in FIGS. 1 A-B. The biofilm reactor has an inlet pipe (1), an outlet pipe with a valve (2) for biologically purified water, and an outlet pipe with a valve (3) for removal of sludge. During normal operation (A) one can have from 90 to 100% filling of the biofilm medium and restricted or nearly no movement of the medium. Biofilm erosion due to collision between biofilm elements will be very small and the concentration of suspended material out of the reactor will be very low.

Figure 1A:
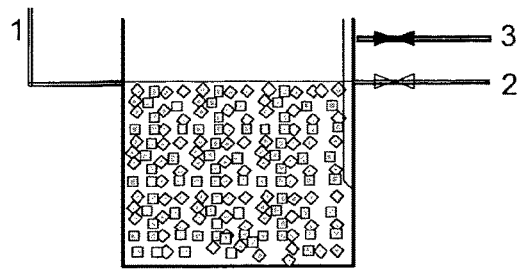
FIG. 1A shows schematically normal operation of the biofilm reactor according to the present invention.
Figure 1B:
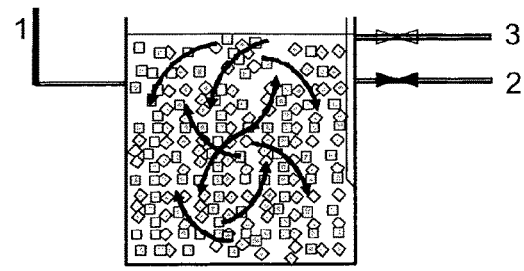
FIG. 1B shows schematically sludge coming loose and being washed out at continuous supply of water to the biofilm reactor.

When one wishes to remove sludge, one first closes the valve for outlet of biologically purified water (2) and opens the valve for removal of sludge (3). When the water level rises up to the level of the pipe (3), one ensures very turbulent conditions in the reactor (FIG. 1B) so that loose biomass, sedimented particles (particles can sediment inside the biofilm elements) and the outer layer of biofilm is torn off and is suspended in the liquid. This assumes that the water level in the reactor increases so much that the degree of filling falls below about 85% and that the biofilm elements are moving rapidly. The necessary turbulence can be set up by blowing in air, with the use of mechanical stirrers or by circular pumping. The required time for the loosening of particulate material can be from 1 minute to about ½ hour, dependent on the shape of the reactor and the strength of the turbulence. Thereafter, sufficient incoming water must pass through the reactor to get the sludge transported out of the reactor through pipe (3). The necessary amount of water to transport the sludge out of the reactor, and thus the volume of sludge water, will normally be from 1 to 3 times the reactor volume, dependent on how low the content of suspended material must be as one again returns to normal operation by opening the valve on pipe (2) (FIG. 1A).

Figure 2A:
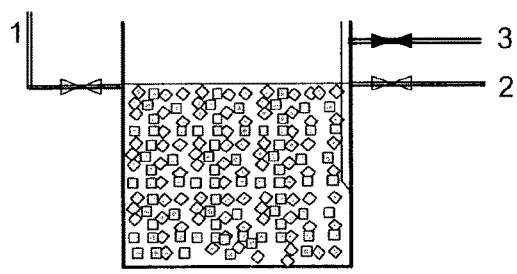
FIG. 2A shows a figure corresponding to FIG. 1A and shows the biofilm reactor during normal operation.
Figure 2B:
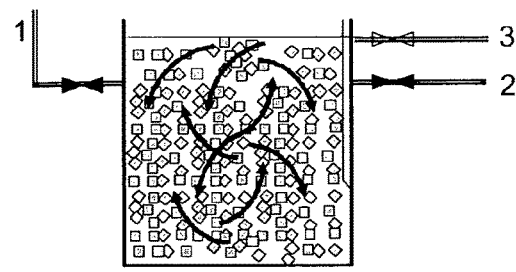
FIG. 2B shows surplus sludge coming loose on stopping the supply of water.
Figure 2C:
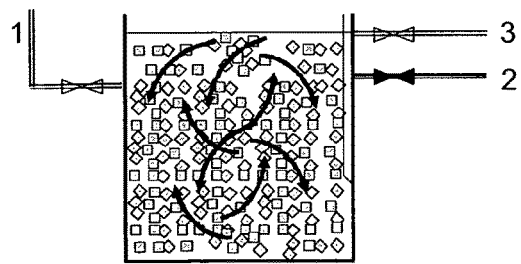
FIG. 2C shows the washing out of surplus sludge.

Standard operating procedure for the new biofilm process with intermittent supply of water and intermittent removal of sludge is outlined in FIG. 2. The biofilm reactor has an inlet pipe with a valve (1), an outlet pipe with a valve (2) for biologically purified water and an outlet pipe with a valve (3) for removal of sludge. During normal operation (A) one can have from 90 to 100% filling of the biofilm medium and restricted or nearly no movement of the medium. Biofilm erosion due to collision between the biofilm elements will be very low and the concentration of suspended solids out of the reactor will be very low.

When one wishes to remove sludge, one first closes the valve for outlet of biologically purified water (2) and opens the valve for removal of sludge (3). When the water level has risen to the level of the pipe (3), one shuts the valve on the inlet line (1). One ensures very turbulent conditions in the reactor (FIG. 2 B) so that loose biomass, sedimented particles (particles can sediment inside the biofilm elements) and the outer layer of biofilm is torn off and is suspended in the liquid. This assumes that the water level in the reactor increases so much that the degree of filling falls below about 85% and that the biofilm elements are moving rapidly. The necessary turbulence can be set up by blowing in air, with the use of mechanical stirrers or by circular pumping. The required time for the loosening of particulate material can be from 1 minute to about ½ hour, dependent on the shape of the reactor and the strength of the turbulence in the reactor.

When sufficient amount of suspended material is in suspension one opens the valve on the inlet line (1) at the same time as one continues with the turbulent conditions in the reactor. Surplus sludge will then be transported out of pipe (3) as shown in FIG. 2 C. The necessary amount of water to transport the sludge out of the reactor, and thus the volume of sludge water, will normally be from 1 to 3 times the reactor volume, dependent on how low the content of suspended material must be as one again returns to normal operation by opening the valve on pipe (2) and shutting the valve in pipe (3) (FIG. 2 A).

The reactors must have an outlet arrangement that prevents that the biofilm elements can leave the reactor, at the same time as purified water and sludge can be led out through pipe (2) and pipe (3), respectively.

In one embodiment the reactor comprises a mixing mechanism for transport of the water and substrate and which supplies oxygen to an aerobic process at the same time. Examples of mixing mechanisms will be diffuser aerators and ejector aerators.

In another embodiment the reactor comprises a mixing mechanism for transport of the water and the substrate in an anaerobic and in an anoxic process. Examples of mixing mechanisms will be mechanical stirrers, circular pumping and anaerobic gas agitation.

In relation to active sludge processes, the present invention has many advantages. There is no need for pumping of recycled sludge. There is no risk of discharge of sludge. The concentration of suspended material out of the bioreactor is low. Thus, the particle load on the sludge separation step will be low and one can use many alternative sludge separation processes, such as, for example, sedimentation, flotation, fine sieving or filtration. The bioreactor can handle considerably higher loads than an activated sludge process, so that the necessary bioreactor volume is considerably smaller and one gets a compact purification plant. In an aerobic process the biofilm elements in the present invention will break up large gas bubbles, reduce the velocity of all the gas bubbles and increase the distance the gas bubbles must travel to get to the surface of the liquid in the reactor. Thereby, one achieves a considerably better oxygen transfer and a lower energy consumption than in an activated sludge process.

The present invention also has many advantages with regard to other biofilm processes. Submerged biological filters with a stationary biofilm medium and without backflushing have problems with blocking and channel formation, in addition to that there is no access to the diffusion aerators at the bottom of the reactors. When there is a need to have access to the diffusion aerators at the bottom of the reactors in the present invention, the biofilm elements can simply be shovelled, sucked or pumped out of the reactors. Furthermore, the present invention has a higher specific biofilm surface area and a considerably higher capacity than the submerged biological filters mentioned above, so that the bioreactor becomes more compact.

Compared to BAF processes, the present invention has the advantage that one does not have to have basins to store water that shall be used for the back-flushing. One can also have a continuous supply of water to the present invention. Furthermore, the present invention tolerates waste waters with a higher concentration of suspended material than what the BAF processes tolerate. With the present invention one has more freedom in the choice of bioreactor shapes and forms. BAF processes have a high pressure drop, while the present invention has a negligible pressure drop across the bioreactor.

In relation to "moving bed" processes, the present invention has a greater extent of filling of biofilm elements. This results in an increased biofilm surface area. In "moving bed" processes, the biofilm elements move around freely and follow the flow pattern of the water in the reactor. This means that the velocity gradient between the biofilm elements and the water is relatively small. In the present invention, the biofilm elements have hindered or no movement and the velocity gradient between the biofilm elements and the water becomes greater. This results in a better transfer of substrate and oxygen to the biofilm so that the rates of reaction increase. Together with an increased biofilm surface area, this means that the present invention leads to a very compact process. The oxygen transfer is also better than in a "moving bed" process. In a "moving bed" process the gas bubbles are, to some extent, slowed down by the biofilm elements, but because the biofilm elements are largely following the water stream that is created by the air bubbles, the effect is considerably smaller than in the present invention where the biofilm elements have a limited or no movement. The present invention will thereby have up to 50% higher specific oxygen transfer than a "moving bed" process.

With the present invention one can achieve, with a powerful turbulence for the washing out of the excess sludge, a somewhat shorter sludge age and somewhat more sludge than in a conventional "moving bed" process. A high sludge production was previously regarded as a disadvantage, now it is viewed as an advantage. A higher biological sludge production means a lower energy consumption, in that the oxygen requirement and thus the need for air is lower. At the washout of sludge as described in the present invention the need for oxygen will be typically reduced by 10 to 20%. If one has degradation tanks on the purification plant, more biological sludge will mean more energy recovery in the form of biogas.

Compared with fluidized bed processes, the present invention is considerably simpler to construct and operate. The energy costs are considerably lower than for a fluidized bed process, because of the high pump costs to keep the biofilm medium (normally sand) fluidized.

The present invention and associated method for removal of excess sludge will have many advantages compared with other biofilm processes:

Removal of excess sludge is brought about by the incoming waste water. Other processes with back-flushing use costly, already purified, waste water. In addition, they need a storage basin for the purified water that shall be used for the back-flushing.

The technique for back-flushing is very simple. The pressure drop is minimal.

Depending on the chosen operating method and the frequency of washout of sludge, one can get a low concentration of suspended solids (SS) out of the reactor (pipe 2 in FIG. 1 and FIG. 2). A thinner biofilm, which one gets from regular washing, is normally more efficient than a thick biofilm. Particles that are in the incoming waste water will, to a large extent, be absorbed in the biofilm between each washing so that one will have a low SS in the outflow.

A lower SS in the outflow than one will achieve in trickling filters, submerged biofilters, bio-rotors or moving bed reactors opens for many possibilities:

If one has not very stringent requirements (for example, secondary cleaning requirements for BOF and KOF) the outlet (pipe 2) can go directly to the recipient.

The outlet can go to a process for separation of particles. This can be sedimentation or flotation as for other biofilm processes. However, the low SS concentration from the present invention opens for the use of micro-sieves or sand filters for the final separation. With the other biofilm processes mentioned above the particle load will be too great for a sand filter.

Excess sludge (pipe 3 in FIG. 1 and FIG. 2) can go; back to the pre-sedimentation for separation together with mechanical sludge; to a thickener (conventional or mechanical); to a fine sieve; or to a small flotation installation. In large purification plants with many parallel lines, a small separation step (for example, a fine sieve or flotation installation) can serve the whole plant in that one washes out the excess sludge from one reactor at a time and distributes the load of excess sludge between the subsequent separation steps over the whole of the 24 hour period.

If required, the supply of water and discharge of biological purified water can be continuous, in that one lets the wash water (pipe 3) pass a separation step (for example, a fine sieve) in connection with the washing, where the sludge particles go further to sludge treatment and the water phase goes to the recipient or to further purification.

Figure 3A:
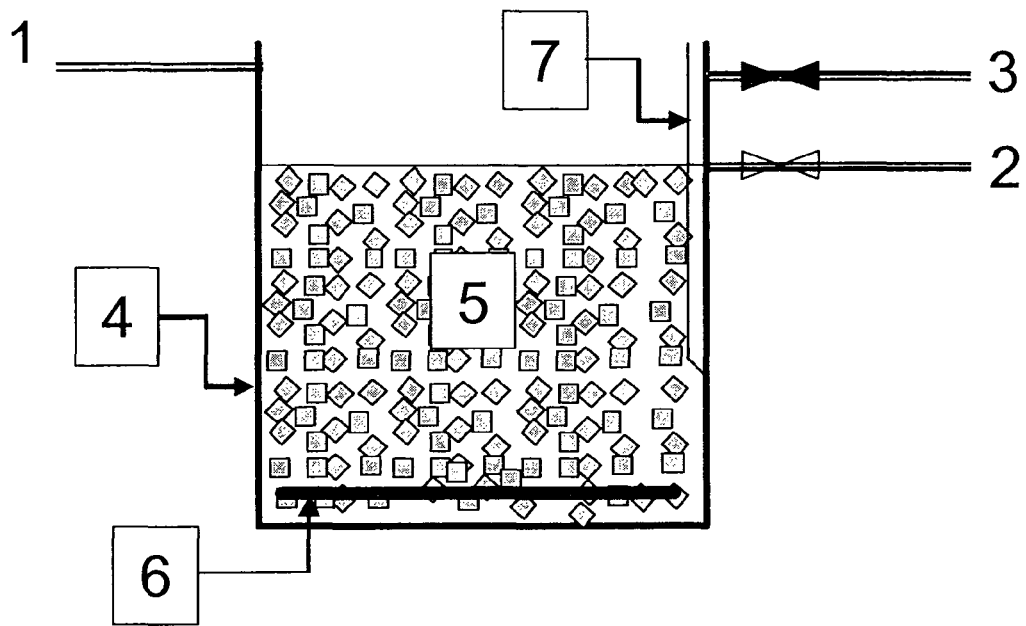
FIGS. 3A, 3B show schematically a section of a biofilm reactor according to the present invention.
Figure 3B:
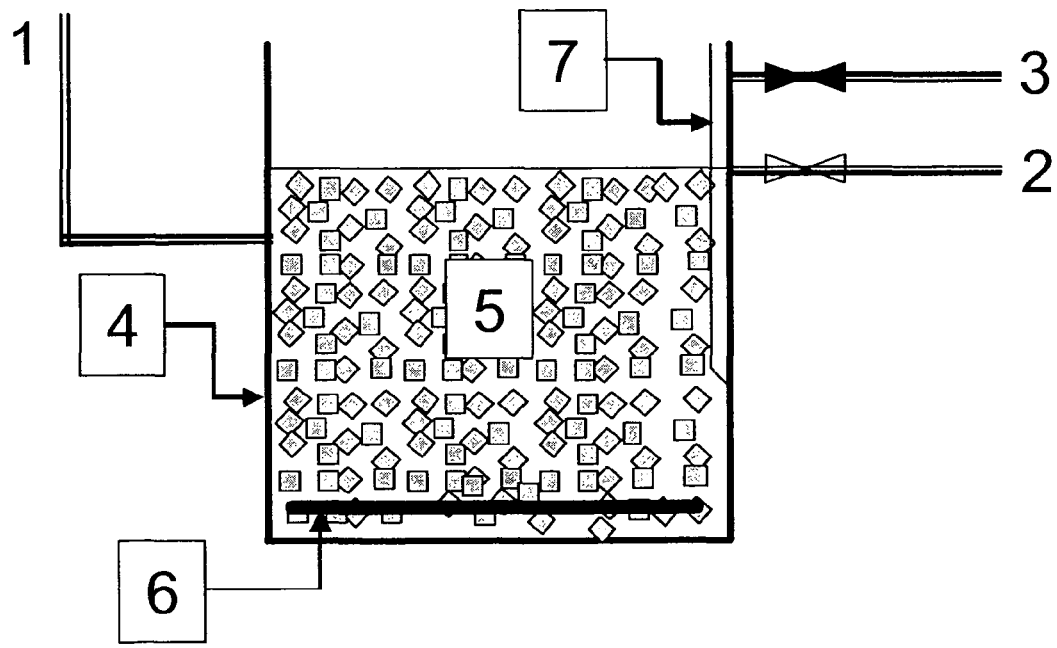

The design of the reactors (4) (see FIGS. 3 A and 3B) represents no limitation for the invention, but it will typically have a flat bottom and vertical walls. The effective depth of the reactor (4) will typically be in the area 1.5 to 12 meters, normally 3.0 to 8.0 meters. The choice of material for the manufacture of the reactor (4) is of no importance for the process and can be chosen freely.

The inflow of water to the reactor (4) can comprise one or more inlet zones, typically arranged with pipes (1) or channel constructions. In aerobic reactors, the water can either enter at the top of the reactor so that one has a water level gap (see FIG. 3 A) or one can have a submerged inlet (see FIG. 3B). For reactors with anoxic or anaerobic processes it is important to avoid entry of oxygen into the water that will occur with an open gap in the water level, and the inlet must therefore be submersed or at the same level as the surface of the water in the reactor during normal operation. Even with a submerged inlet pipe one can lead the water into the reactor by gravitation, also in connection with the removal of sludge, in that the water level in a previous process step or tank lies higher than the highest water level in the reactor. In such case, one will have a filled inlet pipe under pressure. This is illustrated in that in the FIGS. 1, 2 and 3B a curved inlet pipe is shown that extends above the maximum water level in the reactor. Water can also be pumped into the reactor through a submerged inlet pipe with a non-return valve.

The direction of flow of water through the reactor (4) can be both horizontal and vertical.

The outlet of water from the reactor can comprise one or more outlet zones (7), typically with an arrangement to keep the biofilm elements (5) in place in the reactor. The outlet arrangement will typically be characterised in that a construction with openings is used that are smaller than the linear dimensions of the biofilm elements (5).

The aeration system in an aerobic reactor shall ensure that oxygen is supplied to the bioprocess and sufficient energy is provided to tear off loose excess sludge and keep the sludge in suspension in connection with the washing process. The aeration system will typically be placed at the bottom of the reactor (4) and be arranged so that the air is distributed in the largest part of the horizontal extent of the reactor (4).

The invention claimed is:

1. A method for biological water treatment, the method comprising:
    a contaminant-removal process using a reactor, the reactor comprising:
        an inlet;
        a treated-water outlet at a first height, the first height corresponding to a first reactor volume;
        a plurality of biofilm carrier elements having a protected surface area of >200 m²/m³, a pore volume of >60%, and a specific weight of 0.8-1.4 kg/dm³, and that fill at least 90% of the first reactor volume;
        a sludge outlet at a second height of the reactor, wherein the second height is greater than the first height and corresponds to a second reactor volume that is greater than the first reactor volume;
    wherein the contaminant-removal process comprises:
        leading water to be treated into the reactor via the inlet;
        outputting treated water from the reactor via the treated-water outlet; and
        wherein a height of the plurality of biofilm carrier elements does not exceed the first height during the contaminant-removal process; and
    a sludge-removal process comprising:
        while continuing the leading of the water to be treated into the reactor, closing the treated-water outlet, the closing causing the biofilm carrier elements to fill the reactor to less than 85% of the second reactor volume;
        opening the sludge outlet;
        dislodging sludge from the biofilm carrier elements via turbulence; and
        removing dislodged sludge from the reactor via the sludge outlet.

2. The method of claim 1, the method comprising:
    after closing the treated-water outlet and opening the sludge outlet and after a level of the water has reached the sludge outlet, closing the inlet; and
    after the turbulence has ended, opening the inlet.

3. The method of claim 1, wherein the water is continuously supplied into the reactor through the inlet during the contaminant-removal process and the sludge-removal process.

4. The method of claim 1, the method comprising leading the water to be treated via the inlet into the reactor during the turbulence.

5. The method of claim 1, wherein a degree of filling for the plurality of biofilm carrier elements corresponds to 92%-100% of the first reactor volume during at least part of the contaminant-removal process.

6. The method of claim 1, wherein a degree of filling for the plurality of biofilm carrier elements corresponds to 92%-99% of the first reactor volume during at least part of the contaminant-removal process.

7. The method of claim 1, wherein the plurality of biofilm carrier elements have a specific weight of 0.9-1.1 kg/dm³.

8. The method of claim 1, wherein the plurality of biofilm carrier elements have a specific weight of 0.93-0.97 kg/dm³.

9. A reactor for biological water treatment, the reactor comprising:
    an inlet that carries a continuous stream of water to be treated;
    an outlet for treated water positioned at a first height of the reactor;
    wherein a contaminant-removal process comprises the outlet for treated water being open;
    wherein a sludge-removal process comprises the outlet for treated water being closed;
    an outlet for sludge positioned at a second height of the reactor;
    wherein the contaminant-removal process comprises the outlet for sludge being closed;
    wherein the sludge-removal process comprises the outlet for sludge being open;
    wherein the second height is greater than the first height;
    wherein the first height corresponds to a first reactor volume and the second height corresponds to a second reactor volume; and
    wherein the first reactor volume is less than the second reactor volume;
    a plurality of biofilm carrier elements disposed within the reactor;
    wherein the plurality of biofilm carrier elements fill at least 90% of the first reactor volume during at least part of the contaminant-removal process and less than 85% during at least part of the sludge-removal process;
    wherein the biofilm carrier elements have a protected surface area of >200 m²/m³, a pore volume of >60%, and a specific weight of 0.8-1.4 kg/dm³; and
    a mechanism that creates turbulence in the reactor.

10. The reactor according to claim 9, comprising an appliance adjacent each of the outlet for treated water and the outlet for sludge to retain the plurality of biofilm carrier elements within the reactor.

11. The reactor according to claim 9, the reactor comprising a mechanism for transport of the water to be treated and oxygen in an aerobic purification process.

12. The reactor according to claim 9, comprising a mechanism for transport of the water to be treated in an anaerobic and anoxic purification process.

13. The reactor according to claim 9, wherein the mechanism that creates turbulence comprises at least one of an air blower, a circular pump, and a mechanical stirrer.

14. The reactor according to claim 9, wherein at least some of the plurality of biofilm carrier elements exceed the first height during the sludge-removal process.

* * * * *